(12) United States Patent
Øigarden et al.

(10) Patent No.: US 7,585,131 B2
(45) Date of Patent: Sep. 8, 2009

(54) WAVE POWER STATION (75) Inventors: Hans Øigarden, Oslo (NO); Fred Olsen, Oslo (NO)

(73) Assignee: FOBOX AS, Oslo (NO)

( * ) Notice: Subject to any disclaimer, the term of this patent is extended or adjusted under 35 U.S.C. 154(b) by 164 days.

(21) Appl. No.: 10/561,554

(22) PCT Filed: Jun. 11, 2004

(86) PCT No.: PCT/NO2004/000172

§ 371 (c)(1),
(2), (4) Date: Dec. 20, 2005

(87) PCT Pub. No.: WO2004/113718

PCT Pub. Date: Dec. 29, 2004

(65) Prior Publication Data

US 2007/0009325 A1  Jan. 11, 2007

(30) Foreign Application Priority Data

Jun. 23, 2003 (NO) .................................. 20032883

(51) Int. Cl.
*E02B 9/08* (2006.01)
(52) U.S. Cl. ......................................... 405/76; 405/75
(58) Field of Classification Search ............... 405/75–77
See application file for complete search history.

(56) References Cited

U.S. PATENT DOCUMENTS

| 2,783,022 | A | * | 2/1957 | Salzer | 405/76 |
| 4,206,601 | A | * | 6/1980 | Eberle | 405/76 |
| 4,355,511 | A |  | 10/1982 | Jones |  |
| 4,931,662 | A |  | 6/1990 | Burton |  |
| 4,984,935 | A | * | 1/1991 | de Oliveira Filho et al. | 405/76 |
| 5,499,889 | A | * | 3/1996 | Yim | 405/76 |
| 5,507,943 | A | * | 4/1996 | Labrador | 405/76 |
| 7,242,106 | B2 | * | 7/2007 | Kelly | 405/76 |
| 2005/0123353 | A1 | * | 6/2005 | Dick | 405/75 |

FOREIGN PATENT DOCUMENTS

GB    2131887    6/1984

* cited by examiner

*Primary Examiner*—Frederick L Lagman
(74) *Attorney, Agent, or Firm*—Brooks Kushman P.C.

(57) ABSTRACT

A wave power plant arranged to be placed on or in the sea or a lake in order to produce energy, comprising a fixed or floating structure and at least one floating body (1) that moves vertically relative to the floating structure and is connected to the structure via energy transmission devices (11). The floating body (1) is designed to be held in a fixed position during part of the wave induced motion of the body (1), thus to increase the recovery of energy from the waves. A method is also disclosed, in which the body (1) is held in a fixed position during part of the time it takes for a wave crest or trough to pass the body (1).

14 Claims, 12 Drawing Sheets

Egg Dia 3.5m Draught 3.5m

Fig. 7d

Egg Dia 3.5m Draught 4.5m

Fig. 7e

Egg 3.5m Dia Draught 5m

WAVE POWER STATION

The present invention regards a wave power plant designed to be arranged on or in the sea or a lake in order to produce energy using a floating structure and a related method of power production.

A wave power plant is known from WO 01/96738, based on two bodies that are set to oscillate in opposite phases. The bodies are arranged in such a manner that one body forms a ring around the other. Both bodies consist of a floating component and a mass component. The floating component floats awash, while the mass component is rigidly connected to the floating component and is located a distance below the water surface. The mass component is designed to collect surrounding water. By opening and closing ports in the mass component, the inertia of this component can be changed. By so doing, the natural frequency of the bodies can be matched to the wave frequency. Moreover, the two bodies can be given different natural frequencies, causing them to oscillate out of step. A hydraulic connection between the two components provides extraction of energy.

Opening and closing of ports in the mass component means that there are moving parts involved which are submerged more or less the whole time. The strain on these parts is considerable, and they are relatively inaccessible for maintenance. The connection between the mass component and the floating component is also placed under considerable strain. Another significant disadvantage is the considerable movement of the two bodies. Thus the task of maintaining the power plant during operation becomes virtually impossible.

A wave power plant is also known from U.S. Pat. No. 5,359,229, in which floating bodies partially filled with water are excited by waves.

Furthermore, a wave power plant is known from U.S. Pat. No. 4,931,662, in which the natural frequency of a floating body can be adjusted to the wave period by means of a ballast system.

GB 2043790, U.S. Pat. No. 4,742,241 and U.S. Pat. No. 4,453,894 also disclose wave power plants.

The primary object of the present invention is to increase the output of energy from the wave power plant. This is achieved by arranging the floating body to be locked in place during part of the wave induced motion of the body, thus to increase the energy recovery from the waves.

It is furthermore an object of the present invention to provide a method which gives a greater output of energy. In a first aspect this is achieved by holding the floating body in a fixed position relative to the structure during part of the period when a wave crest passes the floating body, and releasing the body while an upward force is exerted on the body from the waves, which force is greater than the weight of the body. In a second aspect this object is achieved by holding the floating body in a fixed position relative to the structure during part of the period when a trough passes the floating body, and releasing the body while the weight of the body is greater than the upward force from the wave acting on the body.

A secondary object of the present invention is to provide a power plant with a simpler design, with a minimum of submerged moving parts. Moreover, it is an object of the present invention to make it possible to move around on the power plant while in operation. It is a further object of the invention to improve the efficiency of this type of power plant.

A power plant with an even higher efficiency is achieved by arranging the floating body to be held in both a lower and an upper fixed position, which lower position is such that a wave crest exerts an upward force on the floating body which is greater than the weight of the body, and the upper position is such that the weight of the body acts with a downward force that is greater than the power effected by a through.

An improved power plant is achieved by designing the floating bodies to float awash and to be partially filled with water, and by them being connected to the floating structure via energy transmission devices.

The floating bodies comprise means of increasing or reducing the volume of water in the floating bodies, thus allowing the natural frequency of the floating bodies to be matched to the wave period.

The means comprise an opening at the lower end of the floating body, thus making it easy to fill the floating body with surrounding water.

The means also comprise a closable opening at the upper end of the floating body, giving easy access to open for air displacement in order to fill the floating body.

Alternatively, the means also comprise an adjustable extension of the floating body, which extension is designed to receive water, making it possible to fill the body with more or less water through running the extension in or out.

The floating structure comprises truss work, in which is defined chambers to receive respective floating bodies, thus providing a simple floating structure relatively unaffected by wave motion.

The truss work comprises piping made from a lightweight material, preferably plastic such as PVC, thus providing an inexpensive and light structure with high inherent buoyancy.

The floating body takes the shape of a cylinder with rounded ends, thus providing an easy-to-manufacture floating body with good qualities.

Improved efficiency is obtained by a method where the depth of submersion of the floating body is increased with an increase in wave period, and the depth of submersion is reduced in the case of shorter wave periods, thus maintaining the maximum deflection of the floating body (natural frequency) close to the wave period. This provides a possibility of optimising the production of energy in cases of variable wave frequencies.

Increasing or reducing the depth of submersion by lowering or raising the floating body to the desired depth of submersion and allowing water to flow into or out of the floating body until the water level inside the floating body is approximately the same as that outside the floating body, provides a simple means of controlling the depth of submersion.

The invention will now be explained in greater detail through preferred embodiments and with reference to the accompanying drawings, in which.

Figure 1A:
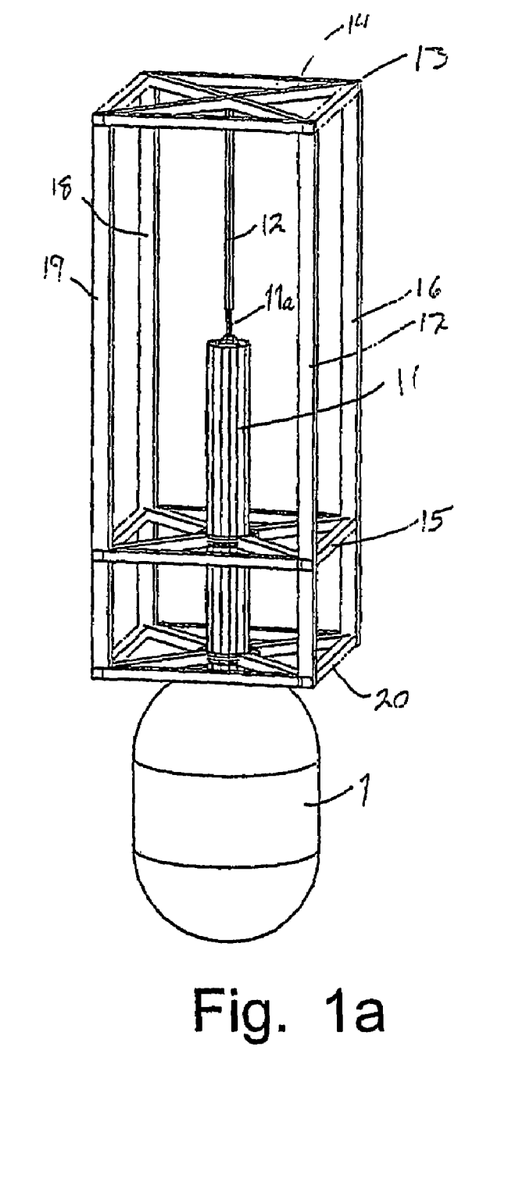
FIGS. 1a and 1b show a floating body with associated suspension in the upper and lower positions, respectively.
Figure 1B:
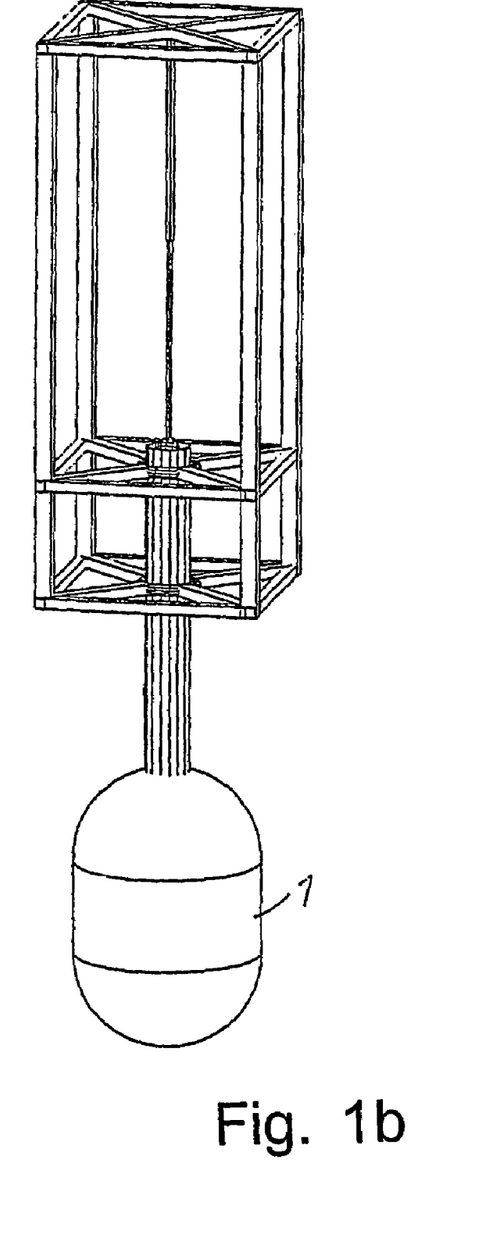

FIGS. 1a and 1b show a floating body 1 with associated suspension. In the preferred embodiment, the floating body 1 has a circular cylindrical mid section 2 and two hemispherical ends 3 and 4. This shape is similar to a so-called Kinder egg. The body is a shell construction, which can be made of a suitable metal or a plastic material such as PVC.

Figure 2A:
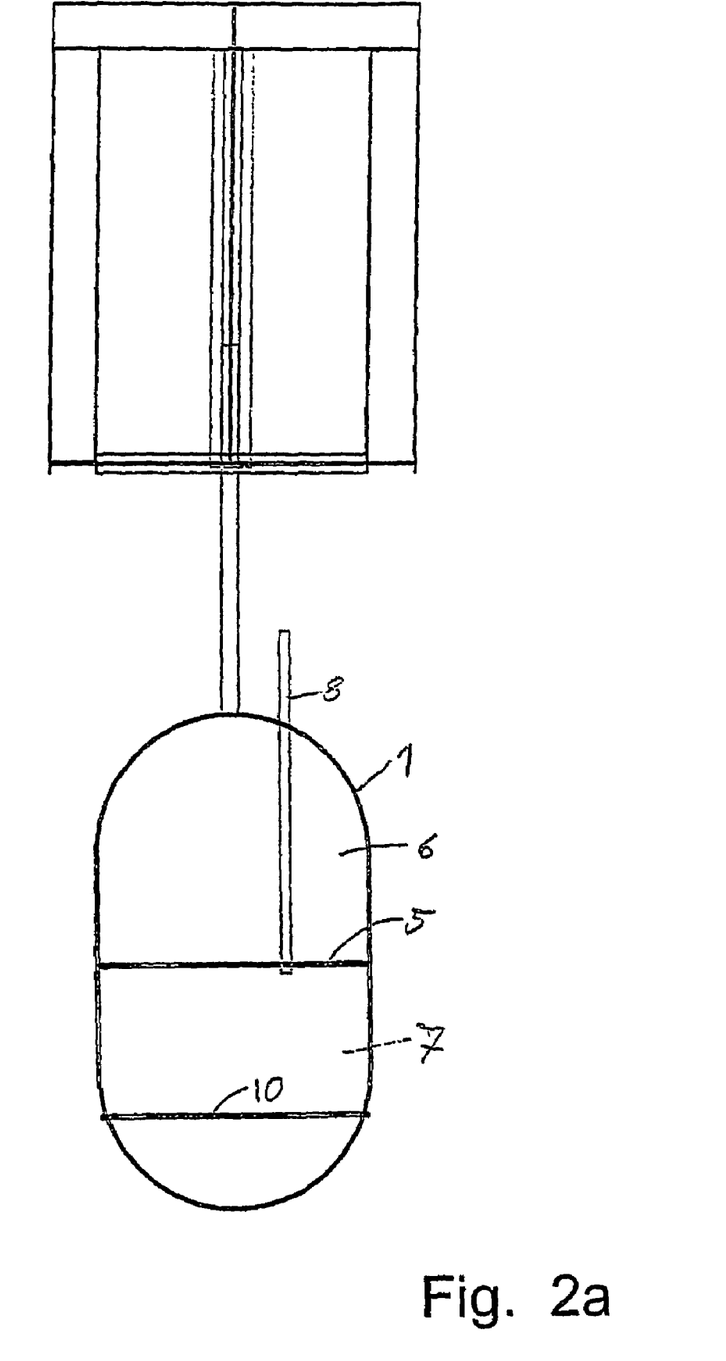
FIG. 2a is a section through the body in FIG. 1.

FIG. 2a shows a section through the floating body 1. The body has an internal partition 5 that divides the interior of the floating body into two cavities, an upper cavity 6 and a lower cavity 7. A pipe 8 extends through the partition 5 from the lower cavity and out through the upper hemispherical part 3 of the floating body 1. At the upper end, the pipe 8 is fitted with a closing device (not shown).

In the lower hemispherical part 4, preferably at the lowermost point, the floating body is provided with an opening (not shown). Water can be admitted through this opening to the lower cavity 7 when the air in this is allowed to escape through the pipe 8. In FIG. 2a, the water level is indicated at 10.

By admitting more or less water into the cavity 7, the weight, and thereby the draught of the body 1, may be controlled. This will affect the natural frequency at which the floating body will oscillate, which will be understood from the following description.

The floating body 1 is suspended from a rod 11 which is connected to a piston rod 11a in a hydraulic or pneumatic cylinder 12. The upper end of the cylinder 12 is attached to a frame 13. Obviously, the piston rod and the cylinder may be interchanged such that the cylinder is fixed to the floating body and the rod to the frame. Alternatively, the hydraulic cylinder may be disposed next to a guide rail. There can also be two cylinders, where one takes care of upward movement and the other takes care of downward movement. The frame 13 comprises a frame 14 of horizontal beams and vertical beams 16, 17, 18, 19 that project down from this. The beams 16, 17, 18, 19 are placed against a lower frame 20 composed of beams. The beams may be I-beams made from a metal or a plastic such as PVC. There is also an intermediate frame 15, which in principle is like frame 20. At the centre of the frames 15 and 20 there are guides 15a, 20a, respectively, through which the rod 11 extends.

Figure 2B:
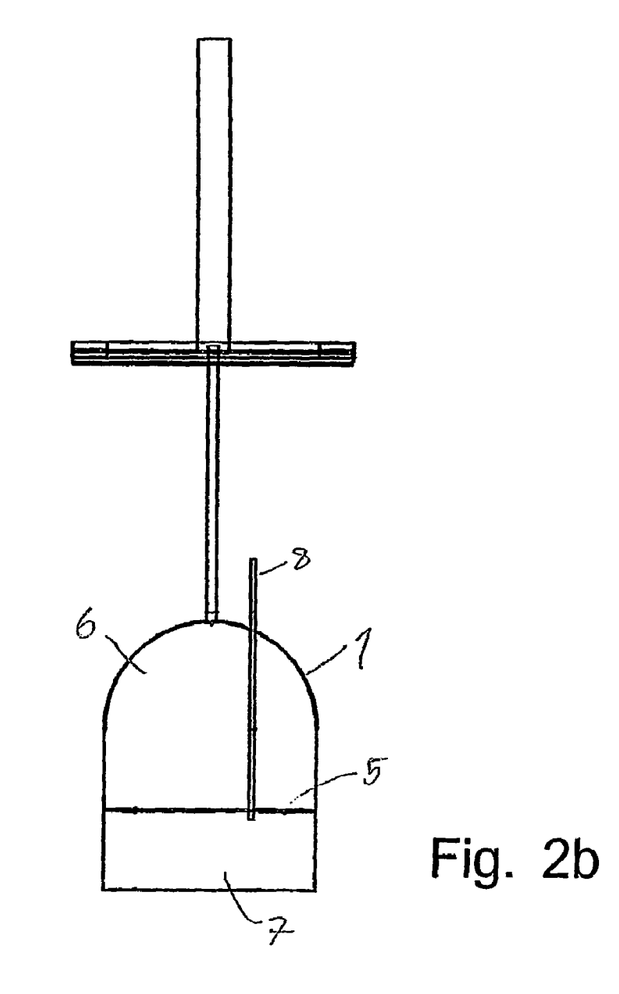
FIG. 2b is a section through another embodiment of the floating body.

FIG. 2b shows a section through another embodiment of the floating body 1. Here, the body has a fully open base instead of a hemispherical base with a small opening. This body also has an internal partition 5 that divides the interior of the floating body into two cavities, an upper cavity 6 and a lower cavity 7. A pipe extends through the partition 5 from the lower cavity and out through the upper hemispherical part 3 of the floating body 1. At the upper end, the pipe 8 is provided with a closing device (not shown).

The base being fully open allows the body to be filled with and emptied of water more rapidly. This is of great consequence in a situation that requires rapid adjustments as a result of varying wave periods.

Figure 3:
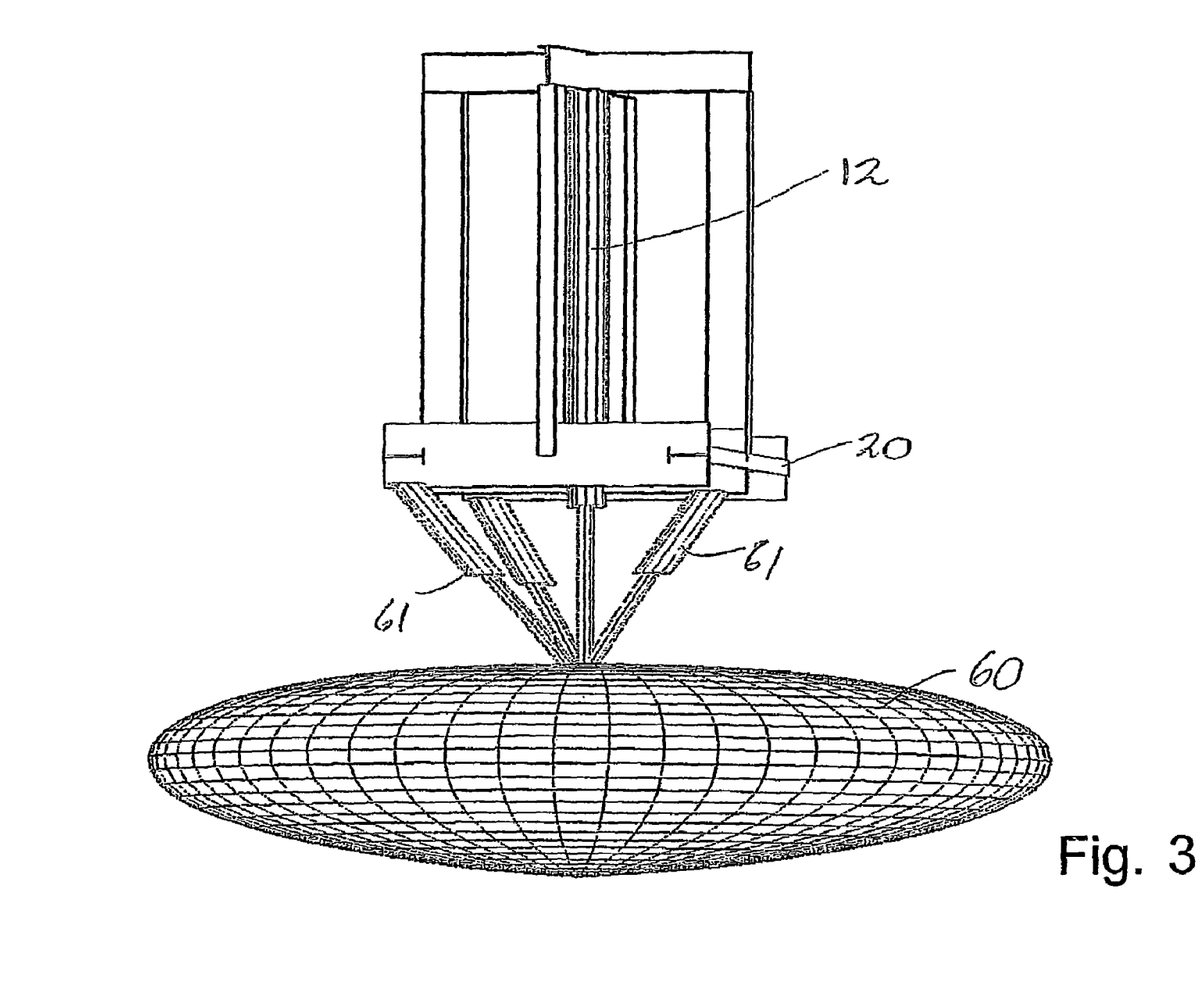
FIG. 3 shows an alternative suspension and an alternative floating body.

FIG. 3 shows an alternative suspension for the floating body. Here, a floating body 60, which also has an alternative shape (ellipsoid), is suspended from three diagonal cylinders 61, in addition to being suspended from a central cylinder 12 such as in the embodiment in FIGS. 1 and 2. The three cylinders 61 are attached at one end to the lower frame 20 via a universal joint, and at the other end to the floating body in a corresponding fashion. At the lower position of the floating body 60, the cylinders 61 are at an angle of approximately 45 degrees to the vertical, and in the upper position of the floating body, the cylinders 61 are more or less horizontal. This means that they absorb the horizontal forces from the floating body 60. The vertical forces are transmitted to the vertical cylinder 12. Thus it is possible to avoid the vertical guides in the floating structure. The forces absorbed by the diagonal cylinders 61 can also be exploited for power production. The cylinders 61 can also be mounted at a horizontal distance from the vertical cylinder 12, allowing the cylinders 61 to absorb forces caused by pitching and rolling of the body.

Use of the present invention allows the recovery of energy from the wave movement to be optimised by the floating body 1 being forced to move more than the waves. The way in which this takes place, will be explained with reference to FIG. 4.

Figure 4:
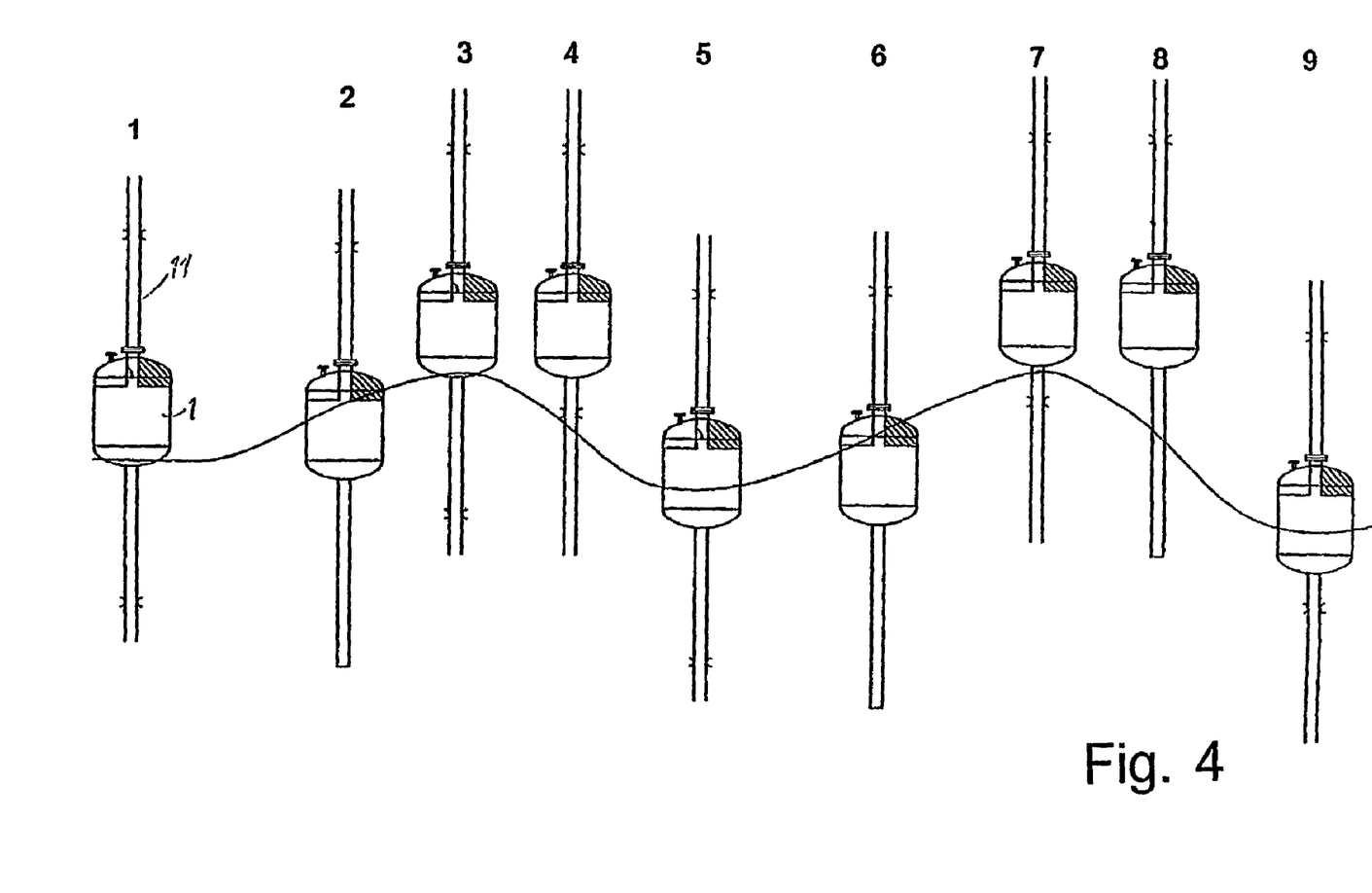
FIG. 4 is a schematic illustration of a sequence of movements of a floating body in accordance with a method of the invention.

FIG. 4 shows nine positions for the floating body. The positions show the state from when a first wave approaches the floating body 1 when the body is at rest, and then when subsequent waves move the floating body. In position 1 a wave approaches the floating body 1, and the wave is in the trough and completely at rest. In the case illustrated, the wave approaches from the left. In position 2, the wave has started to rise around the floating body. The floating body is kept in place by maintaining the rod 11 which connects the body with the platform, in a fixed position. When the crest of the wave reaches the floating body, this is released as shown in position 3, by the locking of the rod 11 being released. The floating body will then pop up with great force and at a high speed. When the body reaches its highest position, the rod 11 is again held in a fixed position, leaving the floating body 1 suspended as the wave passes, as shown in position 4. When the trough is approximately directly under the floating body, this is released and falls into the trough, as shown in position 5. The floating body will then fall deeper than in position 1. As a result of this, the water will rise even more in relation to the floating body 1 when the next wave crest approaches, as shown by position 6. This time, when the body 1 is released, it will leap even higher than in position 4, as shown by position 7. Consequently, the body will fall even deeper when released into the trough again, before being fixed in position. The increase in amplitude continues until a maximum amplitude has been reached. The magnitude of the maximum amplitude depends among other things on how close to the frequency of resonance it is possible to get. It is therefore an aspect of the present invention that the floating body is filled with water to an extent which is sufficient to ensure that the natural frequency of the floating body approaches the natural frequency of the waves.

Preferably, the rod 11 is fixed in position by means of hydraulic locking, e.g. by opening and closing of a valve. When the rod 11 is to be held in place, the valve is closed, and then opened to release the floating body.

The timing of the release of the floating body from position 2 or 8 can be determined by the vertical force exerted on the floating body by the wave. The ideal time will be when the vertical force from the wave is at a maximum. This force may be measured by means of sensors in the hydraulic system. However, the wave should not pass over the top of the floating body, as the body will then require a certain force to break the water surface.

After opening, the valve that locks the hydraulics can be kept open for approximately the time it takes for the wave to pass the diameter of the floating body. Ideally, the floating body will then be at a position of maximum rise. Optionally, sensors may be provided which measure the position of the rod 11 and close the valve just when the rod starts to move downwards again.

The floating body should ideally be released so as to make it land in the trough. Sensors may therefore be provided to measure the wave height at the floating body and release this when the trough is directly under the floating body.

In this way, the length of stroke of the rod 11 will be greater than the wave height, while the period remains the same. This results in a marked increase in efficiency for the wave power plant.

The energy extracted from each floating body if the floating body is not retained as described above, but is allowed to follow the wave motion, is given by the formula (1) below:

$$E=4.5D^{2.4} \cdot H_S^{1.7} \cdot T_P^{-0.9} \qquad (1)$$

where:
B is the output in kilowatts
D is the diameter of the floating body, measured in meters
$H_S$ is the significant wave height, measured in meters
$T_P$ is the wave period, measured in seconds.

The formula is based on a floating body having an oblong shape with rounded ends, in the main as shown in FIG. 1.

If the floating body is retained and released as described above in connection with FIG. 4, the formula (2) will apply:

$$E=K_1(H_S/T_P) \cdot (K_2 D_P + K_3 P) \qquad (2)$$

where:
E is the output in kilowatts
$H_S$ is the significant wave height, measured in meters
$T_P$ is the wave period, measured in seconds
$D_P$ is the displacement of the floating body, measured in tons
P is the retaining power upon release of the body, measured in tons
$K_1$ is a constant of approximately 0
$K_2$ is a parameter approximately equal to RAO (response Amplitude Operator), which will be equal to 1 if the movement of the body follows that of the waves.
$K_3$ is a constant which ideally is approximately equal to 2.5, but which may be between 1 and 3.

The term $K_3 P$ in the formula (2) is the contribution from holding the floating body back until the wave has given the body a maximum upward force, before releasing the body. This term can be said to represent an additional displacement of the body. It has been found that the sum of the displacement of the body caused by the net weight of the body and the additional displacement resulting from the body being retained, should not exceed V·ρ, where V is the total volume of the floating body and ρ is the specific weight of the water. If this value is exceeded, the energy output may be reduced. Another condition is that the water must not rise above the top of the body.

EXAMPLE

The waves have a significant wave height of 4 m and a period of 8 s. A floating body having a diameter of 3.5 meters is used. When entered into formula (1), these data give an output of 135 kW with a body that follows the wave motion.

If the displacement is set to 1000 kg (which is done by filling the body with water) and the body is held back until the upward force from the wave is 24 900 kg and $K_3$ is assumed to be 2.5, while $K_2$ (i.e. RAO) is 1, the output is 317 kW. This represents a considerable increase in output, even at a conservative estimate and RAO equal to 1. However, as will be apparent from the following, a higher RAO-value can be expected when using this method.

The above formulae do not take frictional resistance and similar loss factors into account.

Figure 5:
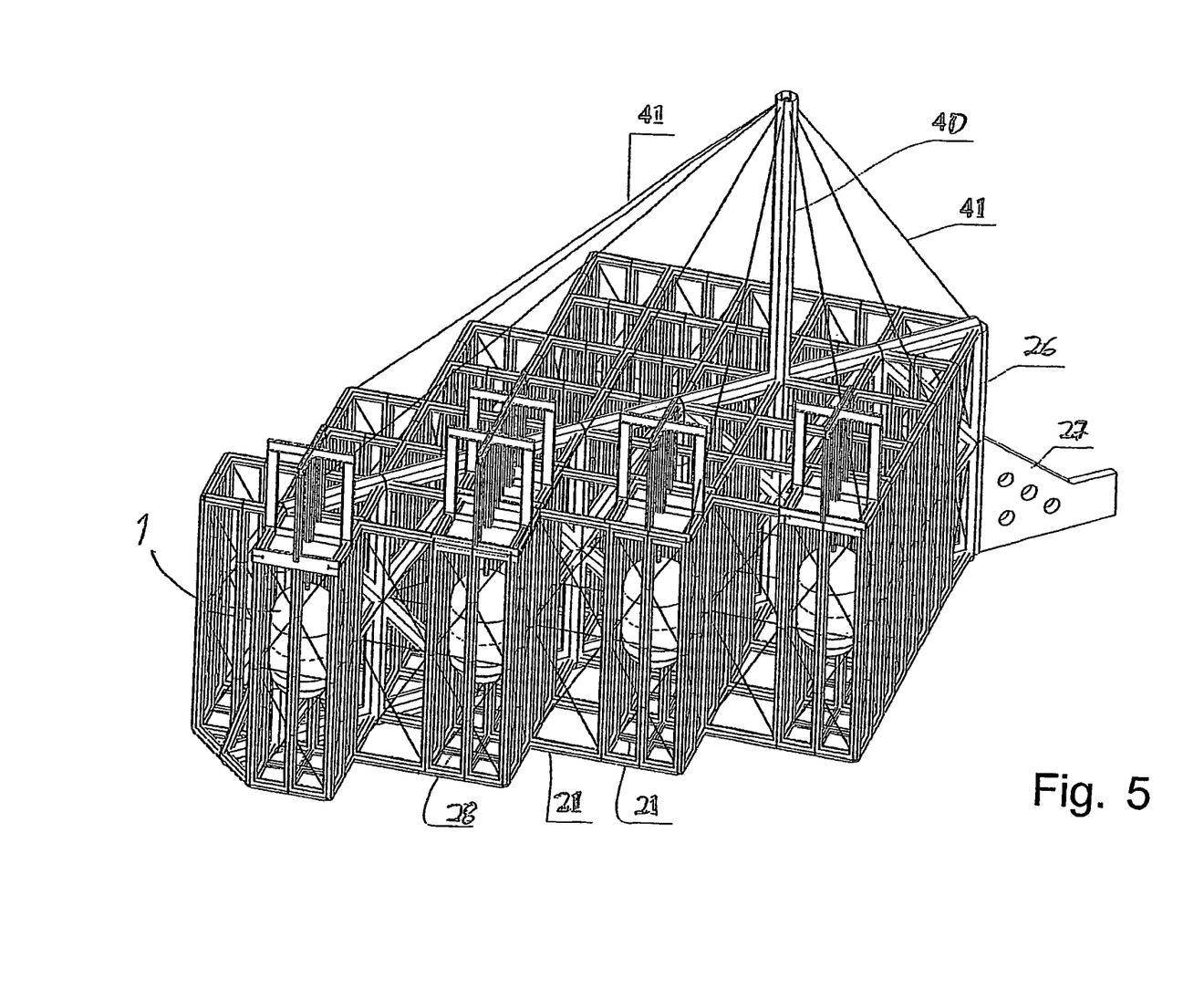
FIG. 5 shows a trussed structure which serves as a floating structure.

FIG. 5 shows an example of an embodiment of a floating structure. This consists of a central, longitudinal sturdy frame 26 with truss work 21, preferably made from PVC pipe, composite or another lightweight, cheap and strong material, which extends out to either side of the frame 26, which truss work 21 defines chambers 22 for floating bodies 1, and a rudder 27 at one end of the frame 26. Assembling the floating structure from pipes will allow it to exhibit sufficient buoyancy merely through the air in the pipes. It is therefore likely that no further buoyancy elements will be required.

In order to be able to reduce the dimensions without sacrificing structural integrity, the floating structure is equipped with a mast 40 from which cables 41 extend to junctions on the structure. With this, the structure is stabilised in the same manner as a cable-stayed bridge, and the entire structure can be made lighter and more slender without any consequences to the seaworthiness of the structure. Instead of the diagonal pipes 25 shown in FIG. 4, use can be made of wire ropes. A signal light may be placed at the top of the mast.

It will be apparent from FIG. 5 that the floating structure has the general shape of a boat with a narrower end opposite the rudder 27. This end is to face the direction of the waves during operation. Consequently, the waves that bit the structure will first hit a few floating bodies at the front of the structure. Thereafter the waves will propagate rearwards and hit an increasing number of floating bodies. This helps to avoid the first floating bodies damping the waves and thus causing the rearmost bodies to be energized to a lesser degree.

Floating bodies are not necessarily arranged in all the chambers 22. It may be a wish to leave some chambers empty, to allow the waves to propagate through the structure with a minimum of damping before they hit the next floating body.

Preferably, those chambers that hold a floating body are provided with cross members 28 at the bottom of the chamber, to prevent the floating bodies from falling through during repairs or by accident.

The floating structure will be appropriately anchored by means of anchors, in a manner such that the front (the bow) faces the prevailing wave direction. Winches may be provided on board, which slacken and take in the anchor line in order to turn the structure against the wave direction. Sensors may be provided at the rudder 27 for this purpose, which sensors register the wave direction and transmits signals to the winches, which in turn slacken and take in the anchor line in order to turn the structure against the waves.

A structure of this type, which is fixed in relation to the wave direction, will also work perfectly well as a breakwater to break up incoming waves, e.g. at a port facility. In this case, this structure will preferably be rectangular and be fixed in relation to the port facility.

The transmission of the hydraulic energy produced in the hydraulic cylinder 12, for further utilisation, will be obvious to a person skilled in the art. This may take place e.g. by hydraulic pressure being transferred via hydraulic lines to a hydraulic motor, which in turn drives an electric generator. Then the electrical energy can be transmitted to shore in a conventional manner per se.

The structure may be equipped with damping devices to dampen wave induced motions of the structure, to ensure that this moves as little as possible in the vertical direction. The wave dampers may be e.g. of the type described in Norwegian patent no. 300883 or Norwegian patent no. 300884. With the structure at the greatest possible degree of rest, it becomes possible for personnel to go on board the structure to carry out maintenance or adjustments.

The floating bodies may be filled with water by opening the closing device at the top of the pipe 8 (see FIG. 2). This is located above water, and as such is easily accessible. During this operation, the piston rod may be locked hydraulically to prevent the floating body from moving. Once the closing device has been opened, water will flow in through an opening 9 at the base of the floating body. By maintaining the floating body at a predetermined depth of submersion, the water can be allowed to fill the floating body until the level inside the body is the same as outside. Afterwards, the closing device can be closed and the hydraulic lock released. The depth of submersion during filling of water is determined by the prevailing wave frequency. If this changes, e.g. due to seasonal variations, the procedure may be repeated. The floating body is run up or down hydraulically to the desired depth of submersion and the closing device is opened in order to either fill more water or let water out. As an alternative to running the floating body up or down hydraulically, use can be made of a crane that can be permanently fixed to the floating structure. The other floating bodies can produce power in the normal manner while this operation is taking place. The purpose of the partition 5 is to prevent the floating body from being over-filled with water. The partition 5 represents the top level for the water in the floating body. Through this, it also becomes impossible for the floating body to sink in case of a fault causing the floating body to detach from the suspension.

Figure 6:
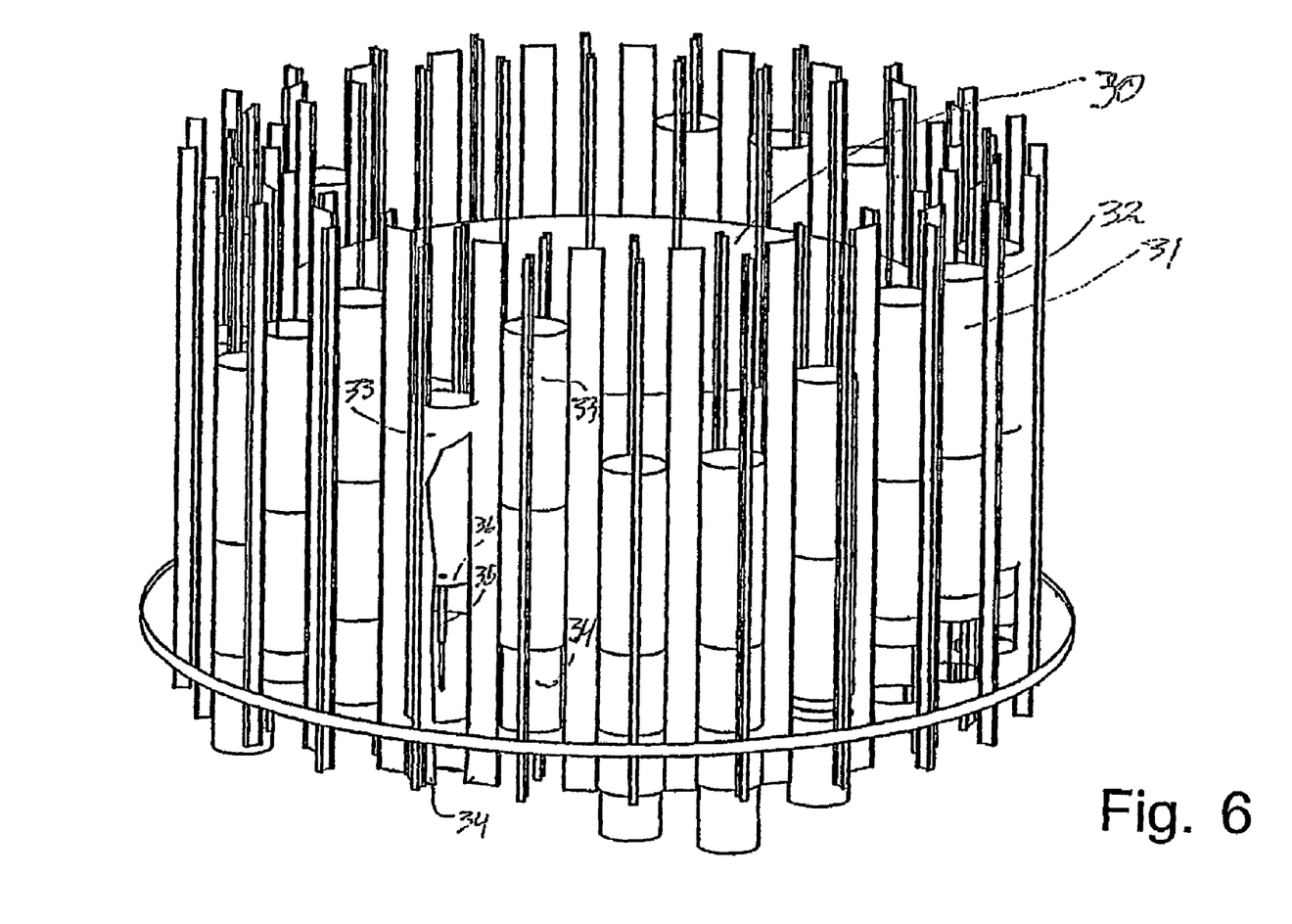
FIG. 6 shows an alternative embodiment of a power plant according to the invention.

An alternative power plant will now be explained with reference to FIG. 6. Here, use is made of a central, preferably circular floating structure 30. Preferably, this has wave dampers such as those described in Norwegian patent no. 300883 or Norwegian patent no. 300884, to keep it as still as possible. Around the floating structure there are floating bodies 31 that can move vertically in guides 32.

Here, the floating bodies 31 are circular cylinders. They comprise an upper pipe 33 and a lower pipe 34. The lower pipe 34 is movable with respect to the upper pipe 33, by means of a hydraulic or pneumatic actuator 35. The lower pipe 34 is open at the bottom to allow it to be filled with water. The upper pipe has a partition 36 that prevents water from penetrating any higher up into the pipe. By running the lower pipe 34 up and down, this can project from the end of the upper pipe 33 to a greater or lesser degree. This means that the water-filled part of the body can be made longer or shorter. The longer this part is, the more water the floating body will "bring along" when moving up and down under the influence of the waves.

Figure 8:
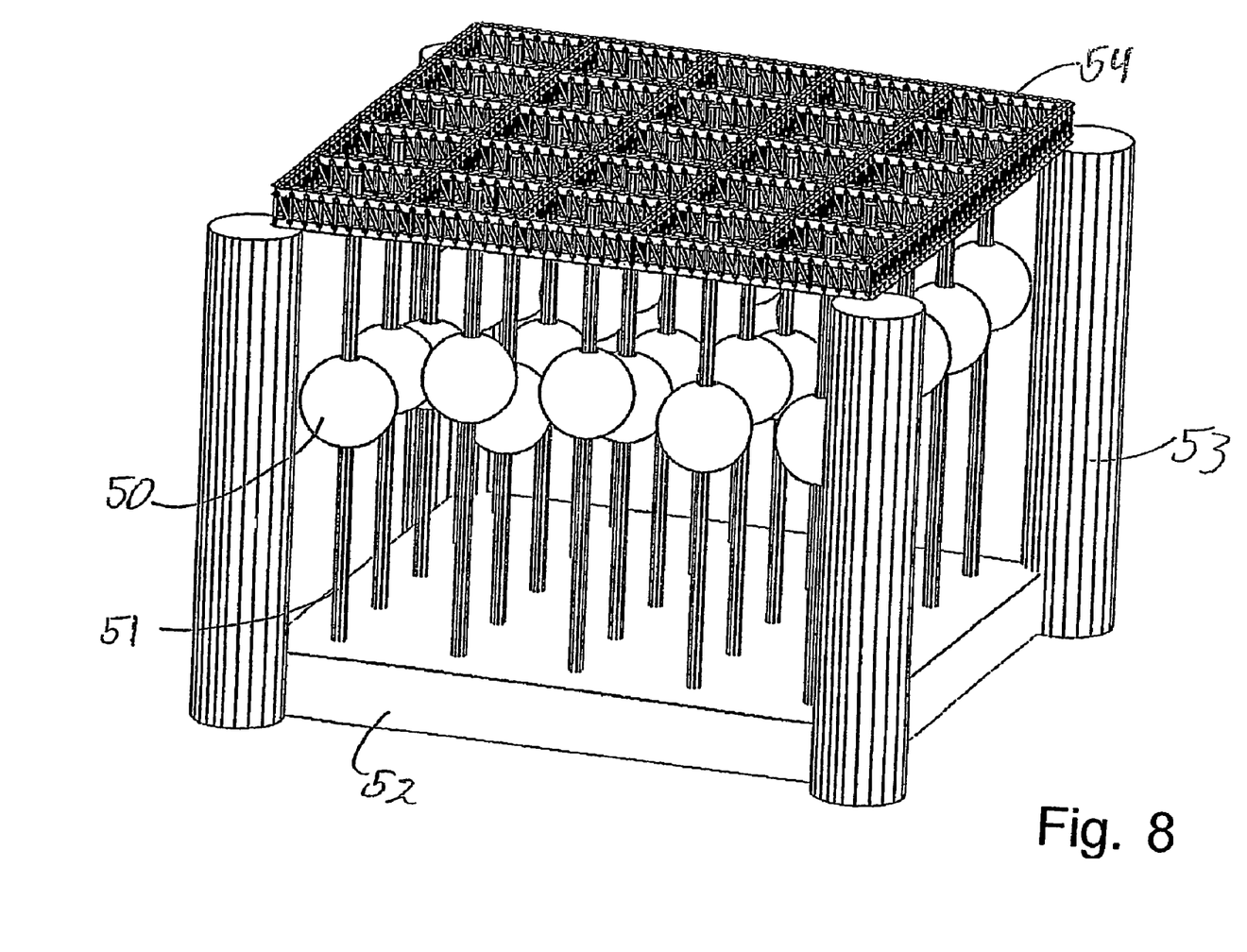
FIG. 8 shows a further embodiment of the wave power plant.

FIG. 8 shows a further embodiment in which the floating bodies 50 are carried on rods 51 extending through a channel in the floating body. This obviates the need for a comprehensive trussed structure to define chambers for holding the floating bodies. The floating structure can therefore be made considerably simpler, and, as shown, can consist of a base 52 and a number of supports 53 that extend from the base, carrying a deck 54. Preferably, the deck 54 consists of truss work. Preferably, the guide rails are attached to the base 52, but they may also be attached to the deck 54. The base 52 and the supports 53 may also be trussed structures.

The base 52 may be shaped so as to rise from the incoming wave end to the outgoing end, or it may be convex.

Otherwise, this embodiment can be built up in the same way as the embodiments of FIGS. 1-5. The hydraulic cylinders can be attached to the sides of the guide rails 51.

A base formed with spoilers may be provided both for the embodiment of the floating structure of FIG. 5 and FIG. 8. Optionally, these may be adapted for movement, so as to allow the height of passing waves to be built up in order to transfer the energy to surface waves, which impart more kinetic energy to the floating bodies.

Figure 9:
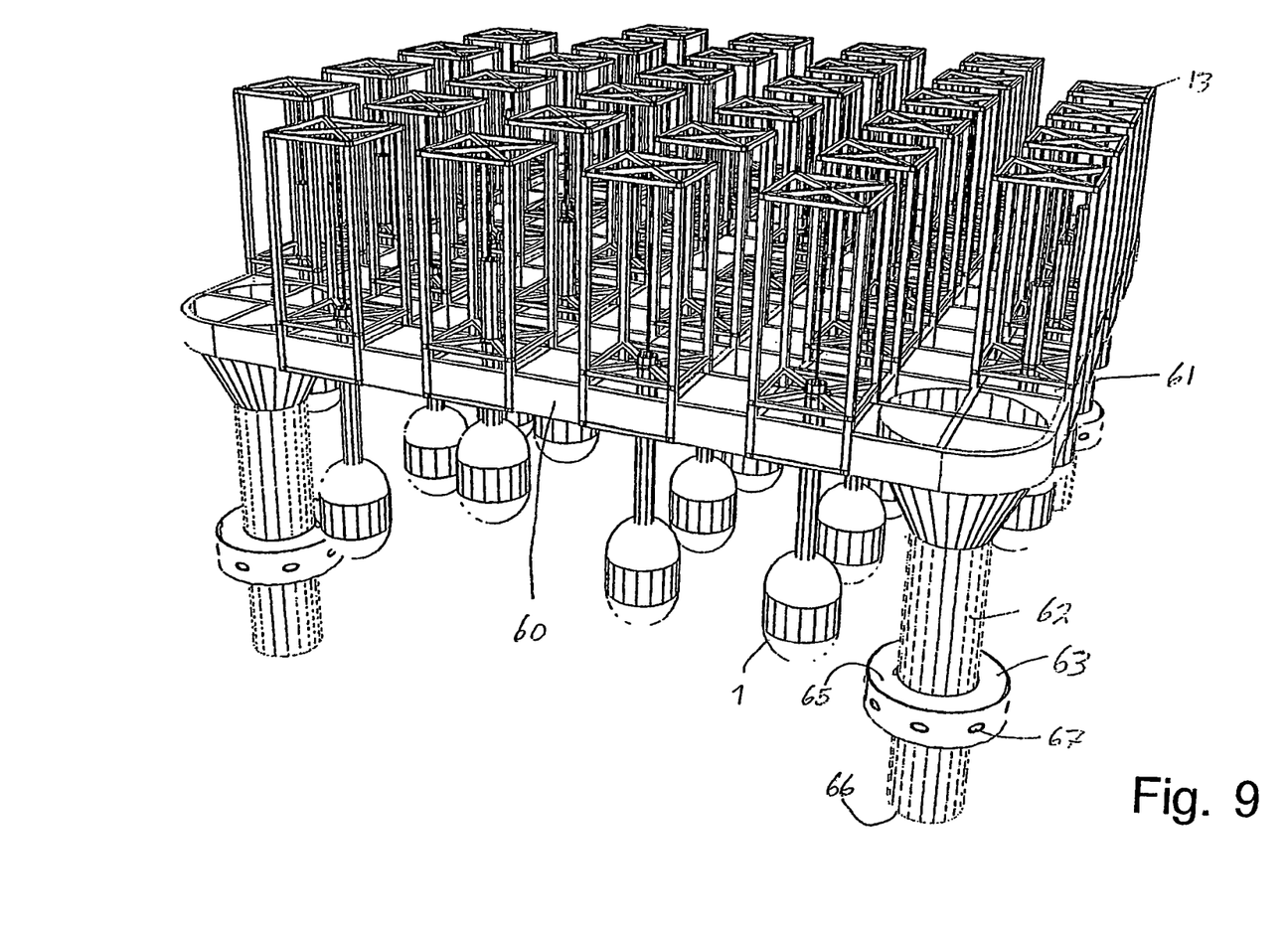
FIG. 9 shows yet another embodiment of a floating power plant.

FIG. 9 shows an embodiment of a floating structure. This consists of a platform deck 60 made up of horizontal beams in a truss work, which truss work defines chambers 61 for floating bodies 1. At each corner of the platform deck there is a platform leg 62. Wave damping means 63 are provided around each leg 62. Preferably, the floating structure is a lightweight structure with inherent buoyancy resulting from the beams and pipes of the structure being hollow. It is possible for the platform to exhibit sufficient buoyancy merely by means of the air inside the platform legs 62. It is therefore likely that no further buoyancy elements will be required. However, this may be provided if necessary.

The wave damping means 63 is constructed so as to trap water through an opening 66 at the base of the leg 62. The water is redirected to a mainly horizontal direction and flows out through narrow openings 67 on the side of the wave damper. At the top of the damper 63 is a curvature 65 that acts against the water when the platform is on its way up, causing the water to change direction. In this way, the platform movements are dampened. There is also a similar curvature at the underside of the damper to brake the downward movement of the platform.

Figure 10:
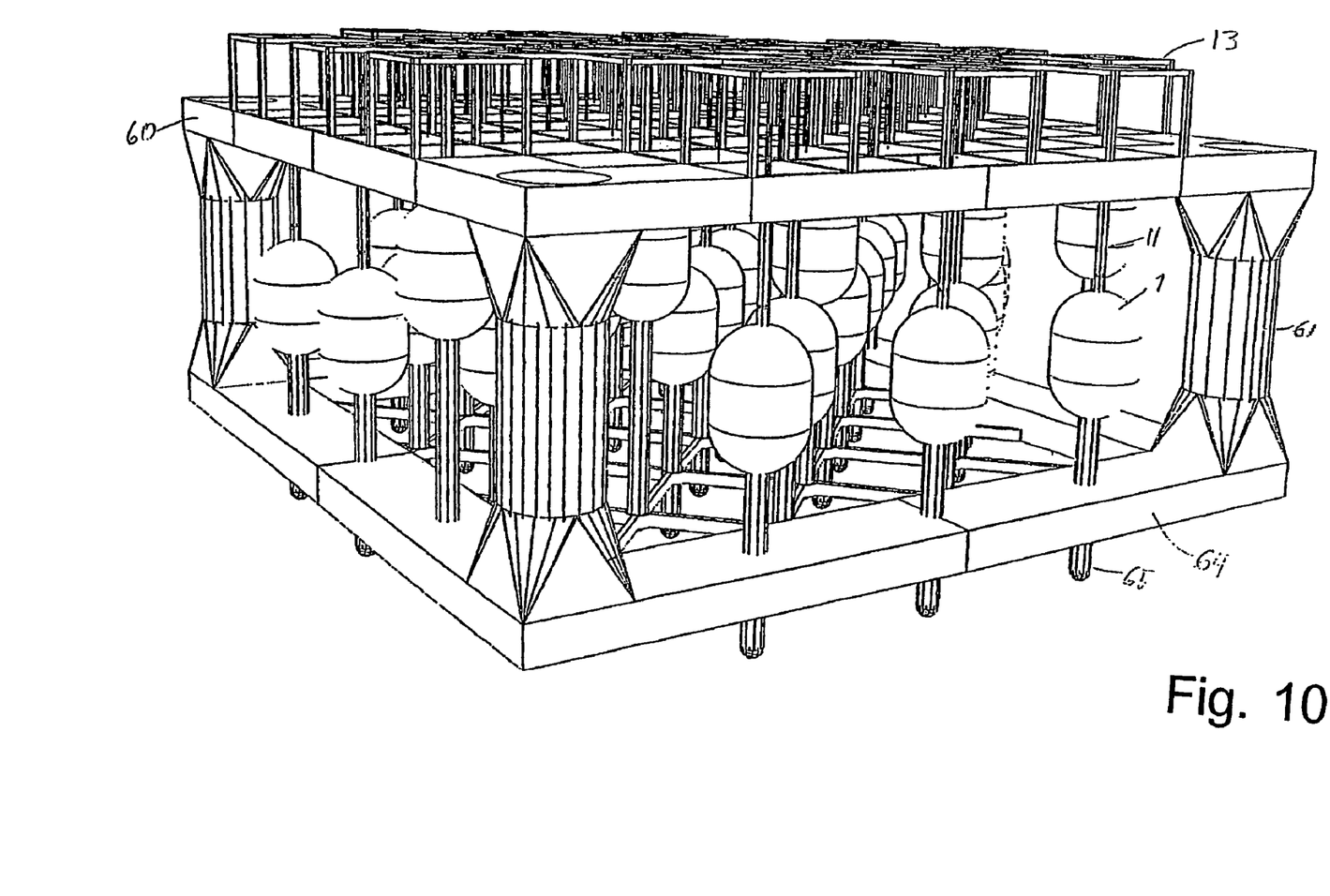
FIG. 10 shows a further embodiment of a floating power plant.

FIG. 10 shows a further alternative embodiment of a floating structure according to the present invention. This has similar characteristics to the embodiment of FIG. 9. The most significant differences are that in the embodiment of FIG. 10, pontoons 64 extend between the lower ends of the platform legs 62, and that guide rods 65 extend from the floating bodies 1 and through holes in the pontoons 64. Because of the guide rods 65, the frame 13 above the platform deck 60 can be made lower, as this only needs to control the rod 11 in one place.

FIG. 10 shows no wave damping means; however, these may obviously also be utilised in this embodiment.

In all the embodiments, it should be possible to ballast the floating structure in order to change its draught, thereby to achieve optimum wave motion through or around the structure.

The effect of the amount of water in the floating body or its depth of submersion will now be explained with reference to the diagrams in FIG. 7. These diagrams show the wave period in seconds along the horizontal axis, while the vertical axis gives the vertical deflection of the floating body in proportion to the Response Amplitude Operator (RAO) of the wave height. An RAO of 1 implies that the floating body is moving in phase with the waves. It is evident from all the diagrams that it requires a certain wave period before the body starts to move vertically. This is because a short wave period gives short waves. Therefore, the body will be both on a wave crest and in a trough at the same time. Thus they cancel each other. When the wave period increases, the wave becomes longer and the body will to an increasing degree be subjected to forces that pull in the same direction.

Figure 7A:
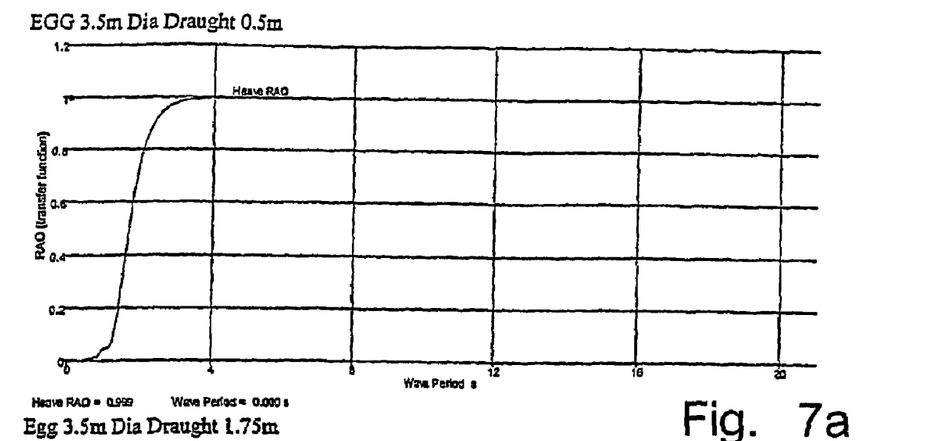
FIGS. 7a-f show diagrams of how a floating body behaves at different depths of submersion, depending on the wave period.

In FIG. 7*a*, a floating body of the type shown in FIG. 1 with a diameter of 3.5 meters, has been filled with water to give it a depth of submersion of 0.5 m and tested under implementation of the method described in connection with FIG. 4. In this case, the body will follow the wave motion from a wave period of 4 s and upwards.

Figure 7B:
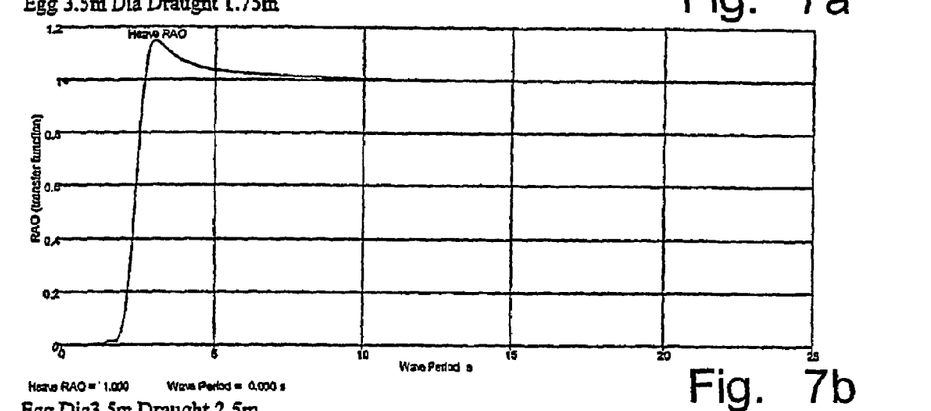

In FIG. 7*b*, the same body has been filled with water until it is submerged to a depth of 1.75 m. Here, there deflection is slightly greater than the wave height at a wave period of 4 s, but not significantly so.

Figure 7C:
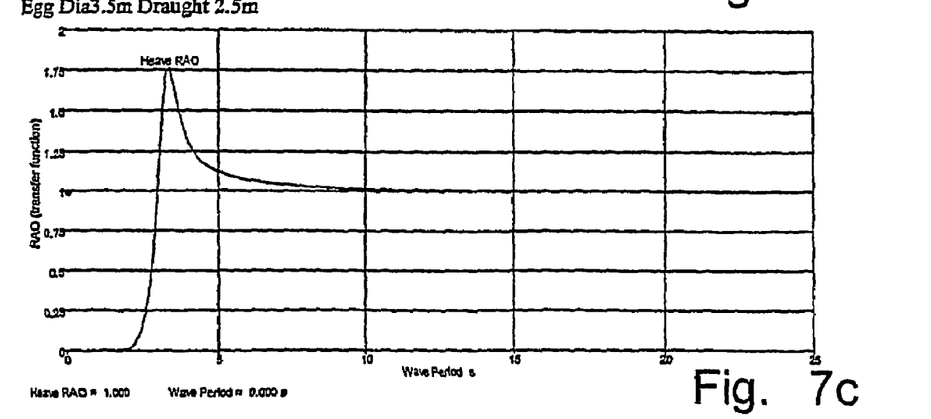

In FIG. 7*c*, the same floating body has been filled with water until it reaches a depth of submersion of 2.5 m. Here, the deflection of the floating body is noticeably greater than the wave height at a wave period of 4 s. This can be seen by the RAO being greater than 1.

Figure 7D:
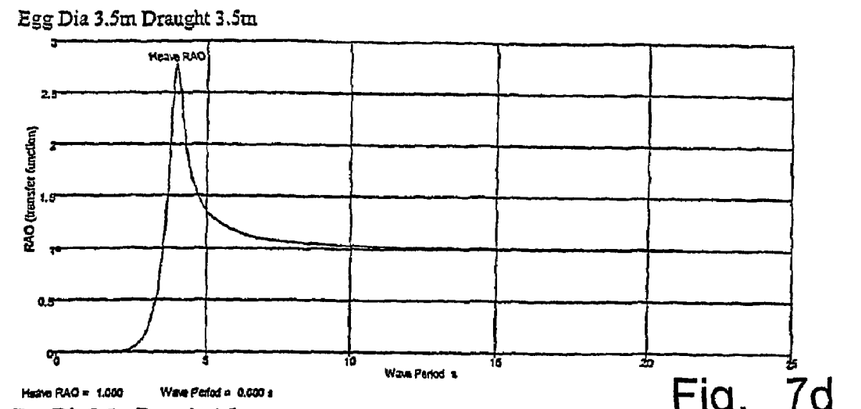

In FIG. 7d, the body in FIG. 1 has been filled with water until it reaches a depth of submersion of 3.5 m. The deflection is even greater relative to the wave height at a wave period of around 4.5 s.

Figure 7E:
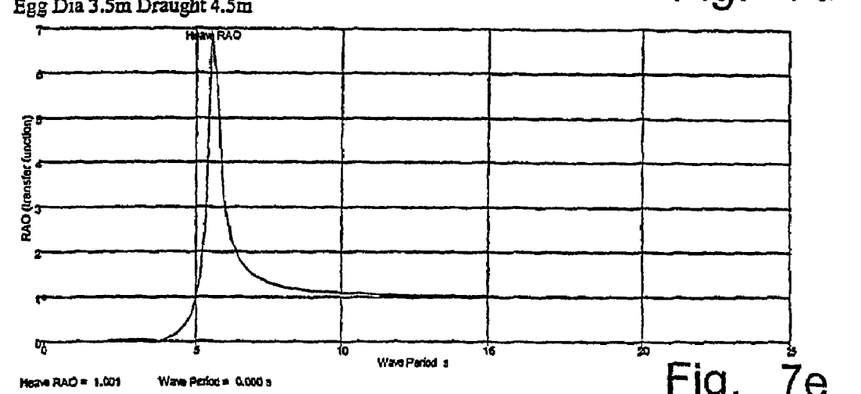

In FIG. 7e, the same body has been filled with water until its depth of submersion is 4.5 meters. Now there is a noticeably greater deflection than the wave height at a wave period of around 6 s.

Figure 7F:
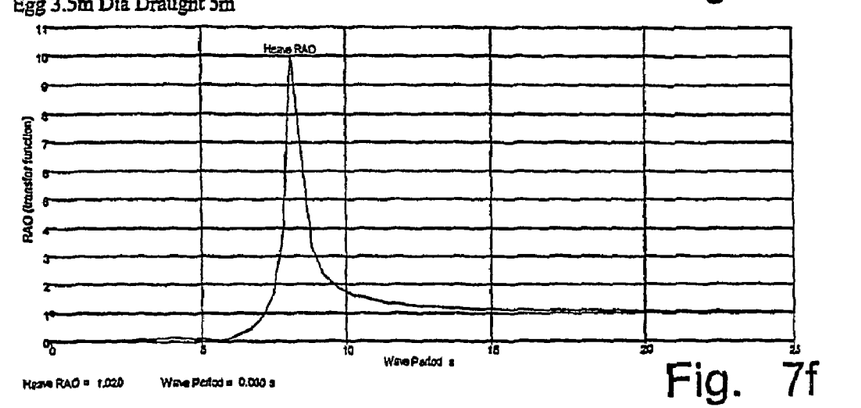

In FIG. 7f, the body has been filled with water to a depth of submersion of 5 m. Maximum RAO is now all of 10, i.e. the deflection can be 10 times the wave height. The maximum deflection will now occur around 7 s.

From this, it is evident that not only can the deflection of the floating body be increased by increasing the depth of submersion, thus increasing the amount of energy produced; the natural frequency of the floating body is also dependent on the depth of submersion. In the case of a short wave period, the depth of submersion of the floating body will have to be reduced, as the deflection may otherwise become smaller than the wave height. In the case of a longer wave period, it is possible to use a greater depth of submersion, which will lead to an increase in the energy production.

It is also conceivable, with the present invention, to equip wave power plants with sensors to measure the wave period and automatically increase or reduce the depth of submersion as a function of the wave period. When using the technique described in connection with FIG. 4, it would be expedient to attempt to optimise the output by filling the body with water until resonance is achieved, i.e. the natural frequency of the floating body is as close as possible to the wave period. The invention claimed is:

The invention claimed is:

1. A wave power plant for placement upon a body of water for producing energy from waves, the power plant comprising:
   a floating structure having a deck, at least one vertically extending column for supporting the deck, and at least one dampener affixed to the at least one column and oriented below the level of the water; and
   at least one floating body for vertical movement relative to the floating structure, the at least one floating body having a collective floating body plane area at water level greater than a collective floating structure plane area at water level,
   wherein the at least one dampener has a height dimension and a width dimension, with the width dimension being greater than the height dimension for stabilizing the floating structure relative to wave motion.

2. A wave power plant according to claim 1, characterized in that the at least one column is open at a lower end so that water may flow into the at least one column and out of the wave dampener when the structure is moving downward relative to the water.

3. A wave power plant according to claim 1, characterized in that the wave dampeners at their upper and/or lower ends have a curvature that re-directs water.

4. A wave power plant according to claim 1, characterized in that the at least one floating body is connected to the structure via energy transmission devices, characterized in that the at least one floating body is designed to be retained during parts of the wave induced motion of the at least one floating body, thus to increase the energy recovery from the waves and that the at least one floating body is designed to be partially filled with water, the at least one floating body comprises means of increasing or reducing the amount of water in the at least one floating body, the means comprise an opening at the lower end of the floating body and the means also comprise a closable opening at the upper end of the at least one floating body.

5. A wave power plant according to claim 1, characterized in that the at least one floating body is designed to be retained both in a lower position and in an upper position, which lower position is such that a wave crest exerts an upward force on the at least one floating body which is greater than the weight of the body, and the upper position is such that the weight of the body acts with a downward force that is greater than the power effected by a through.

6. A wave power plant according to claim 1, characterized in that the at least one floating body comprises means of increasing or reducing the amount of water in the at least one floating body, the means comprise an opening at the lower end of the floating body, a closable opening at the upper end of the at least one floating body, and an adjustable extension of the floating body, which extension is arranged to receive water.

7. A wave power plant according to claim 1, characterized in that the floating structure further comprises truss work in which there are defined chambers designed to hold respective floating bodies.

8. A wave power plant according to claim 1, characterized in that the at least one floating body is supported on a guide rail that is fixed in the structure.

9. A wave power plant according to claim 1, characterized in that the floating structure further comprises truss work, the truss work comprising pipes made from a lightweight material, preferably plastic.

10. A wave power plant according to claim 1, characterized in that the at least one floating body has the shape of a cylinder with rounded ends.

11. A wave power plant according to claim 1, characterized in that the floating structure further comprises a base constructed with adjustable parts in order to build up the height of passing waves, so as to allow the energy to be transferred to surface waves, which impart more energy to the at least one floating body.

12. A method according to claim 1, characterized in that the draught of the floating structure can be raised or lowered through ballasting of the structure, in order to achieve optimum wave motion through or around the structure.

13. A wave power plant according to claim 1, characterized in that the diameter of the at least one column is substantially equal to the diameter of the floating body or bodies.

14. A wave power plant according to claim 1, characterized in that the dampener is adapted to trap water when the structure is moving due to wave induction and re-direct water flowing substantially vertical to a substantially horizontal flow.

* * * * *

UNITED STATES PATENT AND TRADEMARK OFFICE
CERTIFICATE OF CORRECTION

| | | |
|---|---|---|
| PATENT NO. | : 7,585,131 B2 | Page 1 of 1 |
| APPLICATION NO. | : 10/561554 | |
| DATED | : September 8, 2009 | |
| INVENTOR(S) | : Øigarden et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 399 days.

Signed and Sealed this

Fourteenth Day of September, 2010

David J. Kappos
*Director of the United States Patent and Trademark Office*